May 4, 1954

P. PERILHOU 2,677,822

POINT-TO-POINT ULTRASHORT WAVE RADIO LINKS

Filed Nov. 20, 1948

Inventor:
Pierre Perilhou
by Brown & Seward
Attorneys

Patented May 4, 1954

2,677,822

UNITED STATES PATENT OFFICE 2,677,822

POINT-TO-POINT ULTRASHORT WAVE RADIO LINKS

Pierre Perilhou, Clamart, France, assignor to Office National d'Etudes et de Recherches Aeronautiques, Paris, France, a company of France Application November 20, 1948, Serial No. 61,251

Claims priority, application France November 22, 1947

12 Claims. (Cl. 343—117)

This invention relates to the problem of point-to-point ultra-short wave radio-links.

It is known that such waves are propagated "optically" i. e. substantially in a straight line. However, just as in ordinary optics the light rays may undergo certain deflections owing to variations of the refraction coefficient of the atmosphere and give rise to mirage phenomena, etc. the variations of the coefficient of refraction of the atmosphere may cause a variation in the direction of propagation of a plane electromagnetic wave so that the corresponding ray appears to be curved. This curvature takes place almost solely in a vertical plane due to the variation of the coefficient of refraction of the air with altitude.

On the other hand, one advantage of ultra-short waves is the possibility of directing them in the form of sharply defined beams by means of suitable directional aerials. In fact, it is true that the power which may be obtained from such generators is usually small and it is advantageous to concentrate this power along one (or more) preferred directions. The shorter the wave lengths used, the more distinct is the tendency of technicians to make use of said property in order to obtain as high a concentration as possible for an aerial of a given area. However, when the distance between a transmitter and a receiver is great, which is, as a matter of fact, the most interesting case, serious difficulties may arise, at least if certain precautions are not taken.

It is known in fact that a directional aerial is a system which essentially generates a wave surface which is as plane and as extended as possible. If at the receiving end the plane of the incoming wave does not coincide with this preferred position, there occurs an attenuation of the received signal with respect to that corresponding to the preferred position. Now in the case of a variation of the coefficient of refraction of the air assuming that an aerial is adjusted for the maximum reception gain, the plane of the incoming wave rotates through a certain angle according to said coefficient variation; thus, an attenuation of the received signal will take place at this point.

Accordingly, an object of the invention is to provide a new method and system for keeping substantially constant the transmission level of a radio-link of the type specified, in spite of variations of the coefficient of refraction of the atmosphere.

Another object of the invention is to provide a method and system for keeping up the transmission level of a radio-link such as specified at a substantially maximum constant value.

According to the invention, the above objects are attained by acting upon the orientation of the receiving and transmitting aerials so as to keep the mouth of said aerials normal to the path of travel of the waves from one aerial to the other, in spite of the variations of the refraction coefficient of the atmosphere.

The invention thus provides an improved point to point ultra-high frequency radio-communication link comprising in combination receiving and transmitting aerials, respectively provided at said points and which are adapted to orient themselves automatically at the receiver and transmitter ends so as to compensate for variations of the coefficient of refraction of the atmosphere.

According to a further feature of the invention, there is provided an improved point to point ultra-high frequency communication system comprising at both ends directive aerials alternately operating as receiving or transmitting aerial and which are adapted to orient themselves in response to the direction of propagation of the incoming waves at the receiver end so as to maintain a constant and more particularly at its maximum value the transmission level between the two ends.

More particularly and according to another feature of the invention, the transmitting and receiving aerials are pivoted around horizontal parallel axes about which said aerials may be adjusted so that the direction of propagation of radiated and incoming waves respectively, be at right-angles to the mouth of each one of said aerials. The orientation of an aerial or aerials as specified is effected according to a further feature of the invention in an automatic manner in accordance with the angle of the direction of propagation of the incoming waves with respect to the plane of the mouth of the receiving aerial. This automatic control of the aerials is effected according to variations, at the receiving end, of the angle between the incoming waves and the perpendicular to the plane of the mouth of the receiving aerial.

According to another feature of the invention, the automatic control of the orientation of the receiving and transmitting aerials of a U. H. F. radio-link of the type specified, is obtained by subjecting the receiving and transmitting aerials to a continuous oscillation about their respective pivot axes, bringing out at the receiving end the sign and magnitude of the deviation between the aerial and the direction giving the maximum transmission level, said deviation being measured by an electric current which is then used for restoring or maintaining the 90 degree angular relation between the direction of propagation of transmission waves and the plane of the mouth of the aerial at the receiving end as well as at the transmitting end.

According to a further feature of the invention, the deviation between the orientation of said aerials and the direction giving the maximum transmission level is detected by a pair of oppositely connected condensers associated with the receiving aerial and alternately charged with a phase shift of 180 degrees according to the oscillatory motion of the aerials, with a voltage proportional to the amplitude of the incoming radiations, so that a current of a predetermined sense and magnitude begins to flow in a circuit of said condensers in accordance with the magnitude and direction of the deviation of the plane at the receiving aerial with the direction giving the maximum transmission level.

More particularly, the two mentioned condensers are adapted to be charged alternately at the end points of an oscillation swing of a receiving aerial so that a current of one or another direction begins to flow in the circuit of said condensers depending on whether the receiving level is higher for one or the other of the two end points of the oscillation swing of the receiving aerial.

According to a still further feature of the invention, the variation of orientation of the transmitting and receiving aerials about their axes of rotation or oscillation is produced by motors controlled by the output current of said device detecting the direction of the incoming radiations, the sense of said control being that causing a reduction to a zero value of the current which has produced said control.

According to yet another feature of the invention, the controls of the scanning oscillation and of the orientation adjustment of the aerials are obtained through a differential system by means of two motors independent of each other.

More particularly one of said motors generates the periodic scanning oscillation of a given aerial, for example, by means of an eccentric whilst the other motor ensures the angular setting of said aerials in the vertical plane by displacing as a block the first motor with respect to the oscillation axis of said aerial.

The invention will be better understood from the following description taken in conjunction with the accompanying drawings, of one embodiment of the invention.

Figure 1:
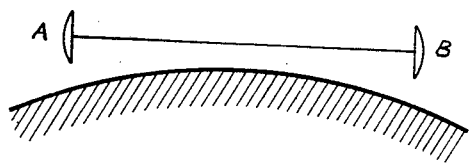
Fig. 1 shows diagrammatically two directional aerials of an ultra high frequency link having an optimum orientation for a straight line operation.
Figure 2:
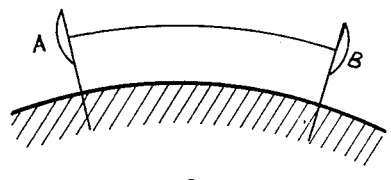
Fig. 2 shows diagrammatically two directional aerials of an ultra high frequency link with an optimum orientation of the aerials in the case of an excessive refraction.

As indicated in the preamble of the present specification, the invention consists in providing on a U. H. F. radio-link system in which the transmitting and receiving aerials which, from the point of view of gain, act symmetrically, are oriented so that the total gain of the system is maintained at a maximum. In effect, in order that the gain of a radio link system of the type specified be a maximum, the path of the radio waves at the transmitting end as well as at the receiving end should be normal to the mouth planes of the repective aerials. Thus, if the waves were transmitted along a straight line as shown in Fig. 1, the two aerials A and B should be arranged as indicated in said figure. However, while such a propagation actually takes place on small distances, it is not maintained unchanged on distances exceeding a certain magnitude. In such a case, the path followed by the waves is bent as indicated diagrammatically in Fig. 2 which requires, when the maximum gain is to be obtained, the rotation of the aerials so as to bring their mouth planes at right angles to the bent path of transmitted waves as indicated in Fig. 2.

According to the invention, the transmitting and receiving aerials are designated to be automatically orientable so that they always assume automatically a position in which the plane of their mouth is substantially at right angles to the wave path at the incoming and outgoing points.

Figure 3:
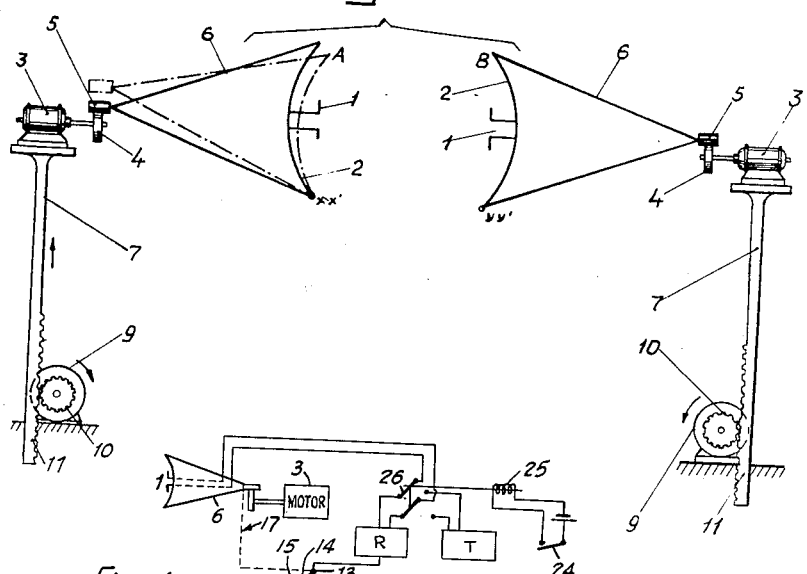
Fig. 3 shows diagrammatically an illustrative embodiment of the orientation control of the directional aerials according to the invention.

In order to make the invention more easily understandable, it will be described now with reference to its use in a simplex operated centimeter wave radio link in which a station listens in or transmits according to the position of a push-to-talk switch, each station being alternately a transmitter or a receiver. The aerials of the two stations constituting such a radio link system are indicated in Fig. 3 at A and B. Said aerials may comprise for instance dipoles or doublets I respectively located at the foci of parabolic reflectors 2. These assemblies are rotatively pivoted about parallel horizontal axes XX' and YY', respectively. Each one of said aerials is able to effect two motions about its respective axis, viz, a periodic oscillatory motion or scanning motion and an orientation setting motion of the aerial controlled in accordance with the result of said scanning. For this purpose, the equipment of each aerial comprises two motors 3 and 9 differentially connected to the aerial, for its actuation, so that each of them may act upon the aerial without affecting the other. As indicated in said figure, one aerial A or B is first actuated by motor 3 through an eccentric 4 cooperating with a roller like cylindrical member 5 provided at the end of a structure 6 integral with the parabolic reflector such as 2 and which imparts thereto a periodic oscillatory motion called a scanning motion. Said motor 3 is mounted on a vertical stem 7 and the position of its axis is vertically adjustable by the second control motor 9 acting upon said vertical stem, by means of a pinion 10 which meshes with a rack 11 provided on said vertical stem 7. Motor 9 is controlled by a relay 12 responsive to error in orientation of the antenna. Actually this relay is responsive to the sense of the current flowing through a circuit comprising two oppositely connected condensers $C_1$ and $C_2$ which are successively charged under the control of a switch 13 actuated in accordance with the oscillatory motion of the corresponding aerial, with a voltage proportional to the amplitude of the received waves. Said voltage may be tapped off before the limiter or clipper of the corresponding receiver.

Figure 4:
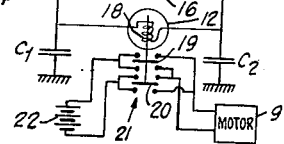
Fig. 4 is a detail diagram showing an embodiment of the electric circuit for controlling the orientation of an aerial or aerials.

As shown in Fig. 4 said switch 13 comprises a movable contact arm 14 and two opposite stationary contacts 15 and 16. The contact arm 14 is actuated by any suitable means represented generally by a mechanical connection 17 with the corresponding antenna structure 6, for actuation in synchronism with the oscillatory movement imparted by motor 3 to said antenna structure, so as to contact periodically the two stationary contacts 15 and 16. This contact arm 14 is connected electrically to a point in the corresponding receiver R, in order to tap off a voltage proportional to the intensity of the received signals. The two stationary contacts 15 and 16 are respectively connected to two separate condensers $C_1$ and $C_2$ having their opposite armatures connected to ground. Relay 12 is connected between said condensers on the side of stationary contacts 15 and 16, and comprises a winding 18 controlling the position of a pair of movable contacts 19, 20. These movable contacts cooperate with a series of stationary contacts 21 provided between a current supply such as a battery 22 and motor 9, to control said motor under the action of said relay.

The passage from condition of reception to condition of transmission is controlled, in a known manner, by push-to-talk switch 24 controlling, by means of a relay winding 25, a commutator 26 connecting antenna 1 either to receiver R or to transmitter T.

The operation of the system is as follows: assuming that station B is transmitting and that station A is receiving, motor 3 of station A is energized and causes said aerial to oscillate. This produces a periodic variation of the received signal in step with said oscillation. At the same time, switch 13 periodically charges condensers $C_1$ and $C_2$, condenser $C_1$ being charged when eccentric 4 lifts assembly 5—6 to its highest position, and condenser $C_2$ being charged when assembly 5—6 assumes its lowest position. It results therefrom that a current is built up between condensers $C_1$ and $C_2$, said current flowing from $C_1$ towards $C_2$ if the reception is stronger when assembly 5—6 is in its highest position and from $C_2$ towards $C_1$ if the reception is stronger when assembly 5—6 is in its lowest position. Said current acts upon a relay 12 which controls motor 9 of which pinion 10 meshes with rack 11 so as to move upwards the assembly comprising the first motor 3 and structure 5—6 if the current flows from $C_1$ towards $C_2$ and to move said assembly downwards in the opposite case until the mouth plane of aerial A is orientated perpendicularly to the path of the incident radiations.

When it is station A that transmits, this device is locked and an operation similar to that described above referring to aerial A now takes place at B, said station B being provided with the same equipment as at station A as indicated in Fig. 3.

In the case of duplex links using two wave lengths in which a station is constantly both transmitter and receiver, the same phenomenon takes place but with a timing scheme or any other switching device, the re-transmission of the information being effected over the channel which is not used for the transmission. Thus, if station A is transmitting and station B receiving for a given time, the aerial of station A will oscillate under the action of motor 3 and will rotate about axis XX' under the action of the signals received by station B aerial and retransmitted by the return channel. Then aerial A being stationary, aerial B will oscillate and rotate about YY' according to signals which it receives itself.

Whilst specific embodiments of the invention have been described and shown, it will be understood that it is not limited to these embodiments but is capable of application to other systems or in other forms within the scope of this invention.

What is claimed is:

1. An aerial system for keeping up at a constant value the transmission level of ultra-short wave radio links comprising a directive aerial mounted for oscillation in the vertical plane of the link, a motor, means for imparting from said motor a periodical oscillatory movement to said aerial, means responsive to angular difference between the direction of maximum transmission level and the mean position of the oscillating aerial, a second motor independent of the first one adapted to be controlled by said responsive means, and means for vertically displacing said first motor as a whole for angularly setting said mean position of the aerial in the plane of the link to nullify said angular difference.

2. An aerial system for keeping up at a constant value the transmission level of ultra-short wave radio links comprising a directional aerial mounted for oscillation in the vertical plane of the link, a motor, eccentric means actuated by said motor for imparting to said aerial a periodical oscillatory movement, means responsive to angular difference between the direction of maximum transmission level of the link and the mean position of the oscillating aerial, a second motor independent of the first one and adapted to be controlled by said responsive means for vertically displacing said first motor as a whole for angularly setting said mean position of the aerial in the plane of the link to nullify said difference.

3. A point-to-point ultra-high frequency radio communication link adapted to operate at a substantially constant maximum transmission level irrespective of the variations of the refraction coefficient of the atmosphere, comprising a directive aerial at each end of the link, means for operating each of said aerials alternately as a receiving aerial or as a transmitting aerial and means for causing each of said aerials, during its operation as a receiving aerial, to seek automatically, in the vertical plane of the link, a position of maximum reception with respect to the incoming radiations from the other end of the link and during its operation as a transmitting aerial to maintain said position.

4. A point-to-point ultra-high frequency radio-communication link adapted to operate at a substantially constant maximum transmission level irrespective of the variations of the refraction coefficient of the atmosphere comprising, a directive aerial at each end of the link, means for operating each of said aerials alternately as a receiving aerial or as a transmitting aerial, means for controlling each of said aerials, upon its operation as the receiving aerial, to scan in the vertical plane of the link a predetermined angle along the direction of propagation of incoming radiations from the other end of the link, means for determining the position of maximum reception for said aerial during said scanning, means controlled by said last named means for automatically adjusting said aerial in said position, and means for interrupting the operation of said controlling means during the operation of said aerial as a transmitting aerial.

5. A method for keeping up at a constant value and particularly at its maximum value the transmission level of ultra-short wave radio links, comprising the steps of causing the aerials at the ends of the link to operate alternately as a transmitting or a receiving aerial, subjecting each of the aerials during its operation as a receiving aerial to a continuous oscillation in the vertical plane of the link, determining at the receiving aerial the sense and the value of the deviation between the aerial orientation and the direction producing said maximum level of transmission, measuring said deviation with an electric current and utilizing said current for setting said transmitting aerial to provide a maximum level of reception at the other aerial and repeating said operation alternately at both ends of the link.

6. The method of establishing a point-to-point ultra-short wave communication link between two stations with directive characteristics which comprises causing the stations at the opposite ends of the link to alternately transmit and receive, automatically adjusting the directional characteristic of one of said stations for maximum reception when the same operates as receiving station, similarly automatically adjusting the directional characteristic of the other station for maximum reception when said station operates in its turn as receiving station, and repeating said operations successively at the opposite ends of the link to maintain continuously at a maximum value the transmission level of said link.

7. The method of establishing a point-to-point ultra-short wave communication link between two stations with directive characteristics which comprises causing the stations at the opposite ends of the link to alternately transmit and receive, automatically adjusting the directional characteristic of one of said stations for maximum reception when the same operates as receiving station while the other station operates as transmitting station, causing said first station to transmit them in a direction determined by said adjustment, similarly automatically adjusting the directional characteristic of said other station for maximum reception when the same operates as receiving station whilst the first station transmits in said adjusted direction and repeating said operations successively at the opposite ends of the link to maintain continuously substantially at a maximum value the transmission level of said link.

8. The method for maintaining continuously at a substantially maximum value the transmission level of an ultra-short wave radio-link between two stations which comprises causing the aerials of said stations to operate alternately as transmitting and receiving aerial, automatically and successively setting the orientation of said aerials, while the same operate one after the other as receiving aerial, in response to deviations of the direction of incident wave propagation from the central axis of directivity pattern of the receiving aerial so as to direct said axis in the direction of maximum reception and causing each of said aerials when operating as transmitting aerial to maintain its orientation as determined by the preceding operation of said aerial as receiving aerial.

9. The method for maintaining continuously at a substantially maximum value the transmission level of an ultra-short wave radio-link between two stations which comprises causing the aerials of said stations to operate alternately as transmitting and receiving aerial, successively subjecting said aerials, while the same operate one after the other as receiving aerial, to a continuous oscillation in a vertical plane passing through the two stations, determining during the reception of said aerial the sense and amount of deviation between the directive axis of the aerial and the direction producing the maximum level of transmission, measuring said deviation with an electric current and utilizing said current for setting or maintaining said axis of directivity of the aerial in the direction of maximum reception and causing each of said aerials when operating as transmitting aerial to maintain its orientation as determined by the preceding operation thereof as receiving aerial.

10. An ultra-short wave radio link, comprising transmitting and receiving apparatus and directive aerials at the ends of the link, means at each end for operating each of said aerials alternately as a transmitting and a receiving aerial, means for subjecting each of the aerials upon its operation as receiving aerial to a continuous oscillatory motion, means including two oppositely connected condensers associated with each aerial for detecting the deviation between the aerial orientation and the direction producing a maximum level of transmission, said means being adapted to charge alternately said condensers, with a phase shift of 180 degrees according to the oscillatory motion of the aerials, with a voltage proportional to the amplitude of the incident radiations and to produce in the circuit of said condensers a current of determined sense and value according to the value and sense of the deviation between the plane of the receiving aerial and the direction of maximum transmission, and means utilizing said current for establishing the 90 degree angular relation between the transmission waves and the plane of the receiving aerial mouth both for receiving and transmitting.

11. An ultra-short wave radio link, comprising transmitting and receiving apparatus and directive aerials at the end of the link, means at each end for operating each of said aerials alternately as a transmitting and a receiving aerial, means for subjecting each of the aerials, upon its operation as a receiving aerial, to a continuous oscillatory motion in the vertical plane of the link, means comprising two oppositely connected condensers associated with the aerials for detecting the deviation between the aerial orientation and the direction producing a maximum level of transmission, said means being adapted to charge alternately said condensers at the ends of the oscillatory period of the receiving aerial with voltages corresponding to the level of received signals and to produce in the circuit of said condensers an electric current the sense of which is determined by the higher reception level at either end of the oscillatory period of the receiving aerial, and means utilizing said current for establishing the 90 degree angular relation between the transmission waves and the plane of the receiving aerial mouth both for receiving and transmitting.

12. An ultra-short wave radio link, comprising transmitting and receiving apparatus and directive aerials at the ends of the link, means at each end for operating each of said aerials alternately as a transmitting or a receiving aerial, means for detecting the direction of the incident radiation at the aerial operating as receiving aerial, and producing an electric current according to said direction, means utilizing said electric current for controlling an electric motor at one of said aerials for setting the orientation of said one aerial, the sense of said control being that annulling said controlling current, and means for repeating said operation at both ends of the link, for keeping the opening area of said aerials in a predetermined angular position with respect to the direction of wave propagation between said aerials independently of the variations of the refractive index of the atmosphere.

References Cited in the file of this patent

UNITED STATES PATENTS

| Number | Name | Date |
|---|---|---|
| 2,125,977 | Zworykin | Aug. 9, 1938 |
| 2,140,130 | Earp | Dec. 13, 1938 |
| 2,173,858 | Pierce et al. | Sept. 26, 1939 |
| 2,245,660 | Feldman et al. | June 17, 1941 |
| 2,257,319 | Williams | Sept. 30, 1941 |
| 2,401,759 | Hersey | June 11, 1946 |
| 2,407,310 | Lundy et al. | Sept. 10, 1946 |
| 2,412,612 | Godet | Dec. 17, 1946 |
| 2,446,024 | Porter | July 27, 1948 |
| 2,479,539 | Moseley | Aug. 16, 1949 |
| 2,510,687 | De Vore | June 6, 1950 |

FOREIGN PATENTS

| Number | Country | Date |
|---|---|---|
| 814,561 | France | Mar. 22, 1937 |